(12) United States Patent
Yang et al.

(10) Patent No.: US 12,181,441 B1
(45) Date of Patent: Dec. 31, 2024

(54) RAPID MEASURING DEVICE AND MEASURING METHOD FOR PERMANENT MAGNET FAILURE TEMPERATURE

(71) Applicant: CHINA JILIANG UNIVERSITY, Zhejiang (CN)

(72) Inventors: Hangfu Yang, Zhejiang (CN); Qiong Wu, Zhejiang (CN); Xiukun Hu, Zhejiang (CN); Minxiang Pan, Zhejiang (CN); Jieyang Fang, Zhejiang (CN); Hongliang Ge, Zhejiang (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/605,794

(22) Filed: Mar. 14, 2024

(30) Foreign Application Priority Data

Jan. 26, 2024 (CN) .......................... 202410112866.5

(51) Int. Cl.
*G01N 27/72* (2006.01)
*G01J 5/00* (2022.01)
*G01J 5/48* (2022.01)
*G01N 1/44* (2006.01)

(52) U.S. Cl.
CPC ............... *G01N 27/72* (2013.01); *G01J 5/48* (2013.01); *G01N 1/44* (2013.01); *G01J 2005/0077* (2013.01)

(58) Field of Classification Search
CPC ........ G01N 27/72; G01N 27/82; G01N 25/00; G01N 25/72; G01N 1/44; G01J 5/48; G01J 5/485; G01J 5/54; G01J 5/0003; G01J 5/08; G01J 2005/0077
See application file for complete search history.

(56) References Cited

U.S. PATENT DOCUMENTS

| | | | |
|---|---|---|---|
| 6,419,387 B1 * | 7/2002 | Legrandjacques | G01J 5/10 374/57 |
| 2007/0216404 A1 * | 9/2007 | McGuiness | G01R 33/1223 324/224 |
| 2016/0252405 A1 * | 9/2016 | Liu | G01R 33/0213 374/163 |
| 2023/0273274 A1 * | 8/2023 | Wu | G01R 33/007 324/244 |

FOREIGN PATENT DOCUMENTS

CN 112326714 A * 2/2021

* cited by examiner

*Primary Examiner* — David M Schindler
(74) *Attorney, Agent, or Firm* — Jeenam Park

(57) ABSTRACT

The present disclosure discloses a rapid measuring device and a measuring method for permanent magnet failure temperature. The device includes a measurement system (1), an infrared thermal imager (2), a vacuum Hall probe (3) and a laser heating device (4). A permanent magnet (5) is used as a sample. These components work together to achieve rapid and accurate measurement of the failure temperature of the permanent magnet sample (5). The present disclosure uses light heating, infrared thermal imaging and surface magnetic field measurement. The heating speed is fast, the temperature measurement is accurate, and the failure temperature measurement of large permanent magnet materials can be achieved.

6 Claims, 3 Drawing Sheets

RAPID MEASURING DEVICE AND MEASURING METHOD FOR PERMANENT MAGNET FAILURE TEMPERATURE

CROSS-REFERENCE TO RELATED APPLICATIONS

The present application claims priority of Chinese Patent Application No. 202410112866.5, filed on Jan. 26, 2024, the entire contents of which are hereby incorporated by reference.

TECHNICAL FIELD

The present disclosure relates to the field of magnetic measurement, and in particular to a rapid measuring device and a measuring method for permanent magnet failure temperature.

DESCRIPTION OF THE PRIOR ART

In recent years, the rapid development of new energy vehicles, high-speed and maglev trains, wind and tidal power generation, energy-saving home appliances and the like in the emerging fields has placed an increasing demand for magnetic materials, especially permanent magnet materials. However, some permanent magnet materials have reduced magnet performance or even fail at high temperature exceeding their working temperature, which causes energy waste and potential safety hazards.

In the prior art, the failure temperatures of permanent magnet materials are mainly measured by measuring devices such as BH tester and VSM. The failure temperature of the magnet is obtained by measuring the magnetization curve and Curie temperature of the magnet. However, these devices can usually only measure small pieces of magnets or powders, and cannot measure the failure temperature of large magnets in motors or the like. Moreover, the measurement time is long, and it takes hours to measure one sample. Magnets are produced in large quantities by manufacturer, and the performance of the magnets also varies. It is impossible to use traditional devices to measure the failure temperature of each magnet, so it is easy to cause safety risks. Currently, there is no device or equipment on the market that can quickly measure the failure temperature of a magnet on site. Therefore, the present disclosure aims to realize rapid measurement of the failure temperature of a large magnet on site.

SUMMARY OF THE DISCLOSURE

In order to solve the above problems, the present disclosure provides a rapid measuring device and a measuring method for permanent magnet failure temperature, which use laser heating, infrared thermal imaging and surface magnetic field measurement. The heating speed is fast, the failure temperature measurement is accurate, and the problem of failure temperature measurement of large permanent magnet materials can be effectively solved.

The above object is realized through the following technical solution: a rapid measuring device for permanent magnet failure temperature, including:
- a measurement system configured with a computer, a data acquisition system and a software processing system for processing, analyzing and displaying measurement data;
- an infrared thermal imager configured to monitor and record temperature changes of a permanent magnet sample in real time;
- a vacuum Hall probe configured to accurately measure magnetic field changes of the permanent magnet sample during heating; and
- a laser heating device configured to accurately control laser output energy for locally and accurately heating the permanent magnet sample.

The measurement system, the infrared thermal imager, the vacuum Hall probe and the laser heating device cooperate with each other to achieve rapid and accurate measurement of a failure temperature of the permanent magnet sample.

Preferably, the infrared thermal imager has a temperature measurement range of $-50°$ C. to $1000°$ C., a temperature accuracy in a range of $0.1°$ C. to $0.5°$ C., and a resolution not less than $640\times480$.

Preferably, the vacuum Hall probe includes a Hall probe and a high-temperature resistant vacuum tube, and the vacuum Hall probe has a sensitivity not higher than 1 Gs, and a vacuum degree not less than $1\times10^{-3}$ Pa.

Preferably, the laser heating device includes a laser source and a power controller configured to control laser energy output, and the laser heating device has a laser output energy range from 1 mW to 1000 W.

Preferably, the measurement system further includes algorithms and software for analyzing a relationship between magnetic field and temperature changes.

Preferably, the laser heating device has an adjustable laser spot diameter ranging from 0.5 cm to 2 cm.

A measuring method using the rapid measuring device of the present disclosure includes:
- step 1: turning on the laser heating device, adjusting a power controller of the laser heating device to adjust a heating laser energy to less than 1 mW, focusing a laser on a surface of the sample, and placing the vacuum Hall probe close to a laser spot;
- step 2: fixing the vacuum Hall probe and using the infrared thermal imager to measure the temperature changes of the permanent magnet sample at the laser spot on the surface;
- step 3: adjusting the power controller of the laser heating device to gradually increase a temperature of the laser spot on the permanent magnet sample, and using the vacuum Hall probe to measure the magnetic field changes near the laser spot on the sample while recording the temperature changes at the corresponding laser spot with the infrared thermal imager; and
- step 4: drawing a change curve of magnetic field and temperature through the measurement system to obtain the failure temperature of the permanent magnet sample.

Preferably, the laser spot in step 1 has a diameter ranging from 0.5 cm to 2 cm, and a distance between the vacuum Hall probe and the laser spot ranges from 1 cm to 5 cm.

Preferably, the failure temperature in step 4 is determined by calculating a first derivative with the change curve of magnetic field and temperature, and wherein the failure temperature is a temperature when the magnetic field begins to change drastically.

The beneficial effects of the present disclosure are as follows.

The present disclosure realizes the rapid positioning and measurement of the failure temperature of the permanent magnet sample by integrating the laser heating device, the infrared thermal imager and the vacuum Hall probe. Compared with traditional measurement technologies, the present method greatly shortens the measurement cycle, thereby significantly improving the measurement efficiency, especially meeting quality control requirement of mass production.

By using the high-precision infrared thermal imager and the highly sensitive vacuum Hall probe, the present disclosure can accurately monitor the surface temperature and magnetic field changes of the permanent magnet sample, ensuring the accuracy and reliability of the measurement data. In addition, the precise control of the laser heating device enables fine management of the sample heating process, thereby further improving the accuracy of failure temperature measurement.

The rapid measuring device of the present disclosure is reasonably designed, easy to operate, easy to realize automatic control, and significantly reduces the technical requirements for the operator. Further, by using the non-contact laser heating and infrared temperature measurement technologies, the safety of the measurement process is greatly improved, avoiding potential safety hazards that may occur in traditional heating measurements.

The rapid measuring device of the present disclosure is not only suitable for failure temperature measurement of various types and sizes of permanent magnet materials, but also can be applied to other fields due to its high efficiency and accuracy, such as the research and development of new materials, optimization of heat treatment processes, etc., with extensive market prospects and application values.

BRIEF DESCRIPTION OF DRAWINGS

In order to explain the embodiments of the present disclosure or the technical solutions in the prior art more clearly, the drawings accompanying the description of the embodiments or the prior art will be briefly introduced below. Obviously, the drawings in the following description only represent some embodiments of the present disclosure. For those skilled in the art, other drawings can be obtained based on these drawings without creative efforts.

LIST OF REFERENCE SIGNS 1, measurement system;
2, infrared thermal imager;
3, vacuum hall probe;
4, laser heating device;
5, permanent magnet.

DESCRIPTION OF EMBODIMENTS

All features disclosed in this specification or all steps in the methods or processes disclosed in this specification can be combined arbitrarily provided that they are not mutually exclusive.

Any feature disclosed in this specification (including any appended claims, abstract and drawings) can be replaced by other equivalent feature or alternative feature for a similar purpose, unless otherwise specified. That is, unless otherwise specified, each feature is only one example of various equivalent or similar features.

Figure 1:
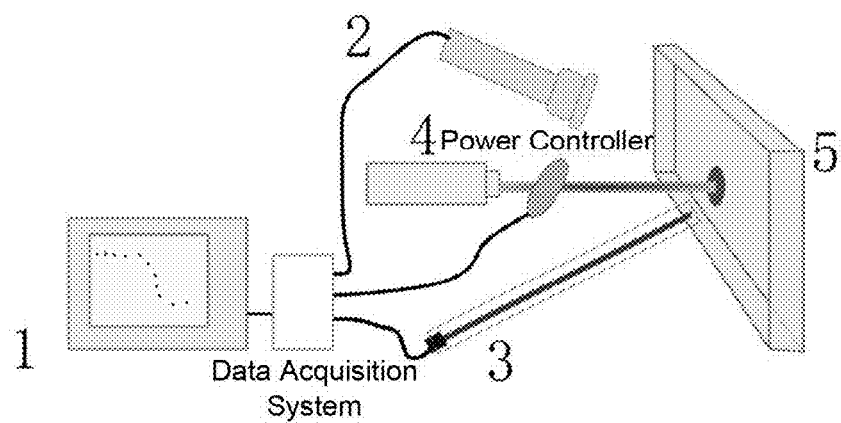
FIG. 1 shows a rapid measuring device for permanent magnet failure temperature according to the present disclosure.

As shown in FIG. 1, a rapid measuring device for permanent magnet failure temperature of the present disclosure includes a measurement system 1, which is configured with a computer, a data acquisition system and a software processing system for processing, analyzing and displaying measurement data.

The rapid measuring device for permanent magnet failure temperature of the present disclosure further includes an infrared thermal imager 2 for real-time monitoring and recording of temperature changes of the permanent magnet sample 5.

The rapid measuring device for permanent magnet failure temperature of the present disclosure further includes a vacuum Hall probe 3 for accurately measuring the magnetic field changes of the permanent magnet sample 5 during the heating process.

The rapid measuring device for permanent magnet failure temperature of the present disclosure further includes a laser heating device 4, which has the function of accurately controlling the laser output energy for locally and accurately heating the permanent magnet sample 5.

The above components cooperate to achieve rapid and accurate measurement of the failure temperature of the permanent magnet sample 5.

In this embodiment, the temperature measurement range of the infrared thermal imager 2 is $-50°$ C. to $1000°$ C., the temperature accuracy ranges from $0.1°$ C. to $0.5°$ C., and the resolution is not less than 640×480.

Specifically, the vacuum Hall probe 3 in this embodiment includes a Hall probe and a high-temperature resistant vacuum tube. The sensitivity of the vacuum Hall probe 3 is not higher than 1 Gs, and the vacuum degree is not lower than $1 \times 10^{-3}$ Pa.

Furthermore, the laser heating device includes a laser source and a power controller. The power controller controls the laser energy output. The laser output energy of the laser heating device 4 ranges from 1 mW to 1000 W.

In this embodiment, the measurement system 1 further includes algorithms and software for analyzing the relationship between magnetic field and temperature changes.

Specifically, the adjustable laser spot diameter of the laser heating device 4 ranges from 0.5 cm to 2 cm.

The steps of the implementation method of the present disclosure are as follows, specifically including:

step 1: turning on the laser heating device 4, adjusting the power controller to adjust the heating laser energy to less than 1 mW and focus the laser on the surface of the sample 5, and placing the vacuum Hall probe 3 close to the laser spot;

step 2: fixing the vacuum Hall probe 3 and using the infrared thermal imager 2 to measure the temperature changes of the permanent magnet sample 5 at the laser spot on the surface;

step 3: adjusting the power controller of the laser heating device 4 to gradually increase the temperature of the laser spot on the permanent magnet sample 5, and using the vacuum Hall probe 3 to measure the magnetic field changes near the laser spot on the sample 5, while recording the temperature changes of the corresponding laser spot with the infrared thermal imager; and step 4: drawing the change curve of the magnetic field and temperature through the measurement system 1 to obtain the failure temperature of the permanent magnet sample 5.

In step 4, the failure temperature is determined by obtaining the change curve of the magnetic field and temperature and calculating the first derivative to obtain the failure temperature of the permanent magnet sample. The failure temperature is the temperature when the magnetic field starts to change drastically.

Example 1

Figure 2:
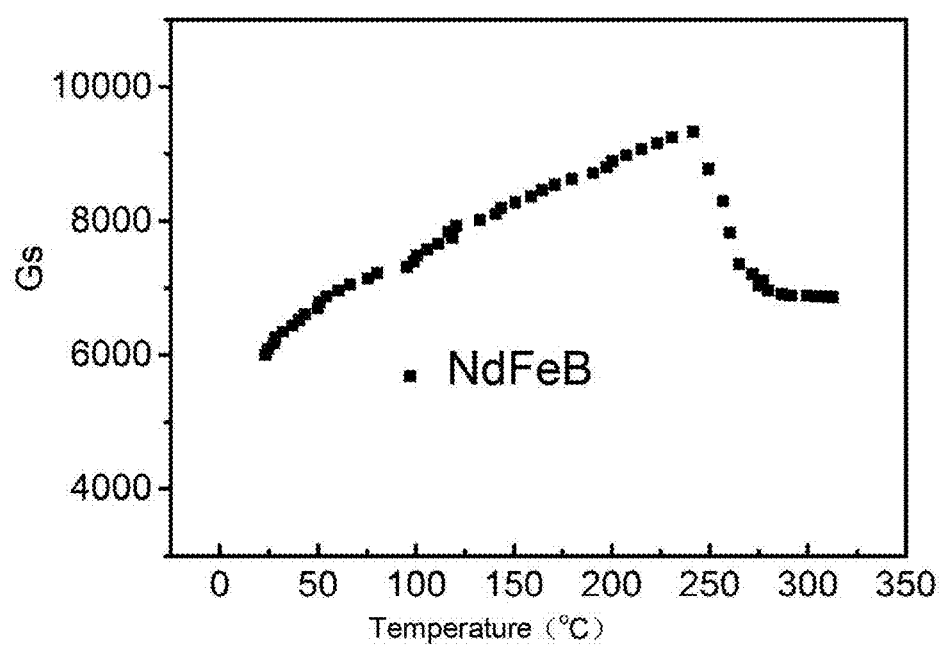
FIG. 2 shows a measured change curve of magnetic field and temperature of a NdFeB sample.
Figure 3:
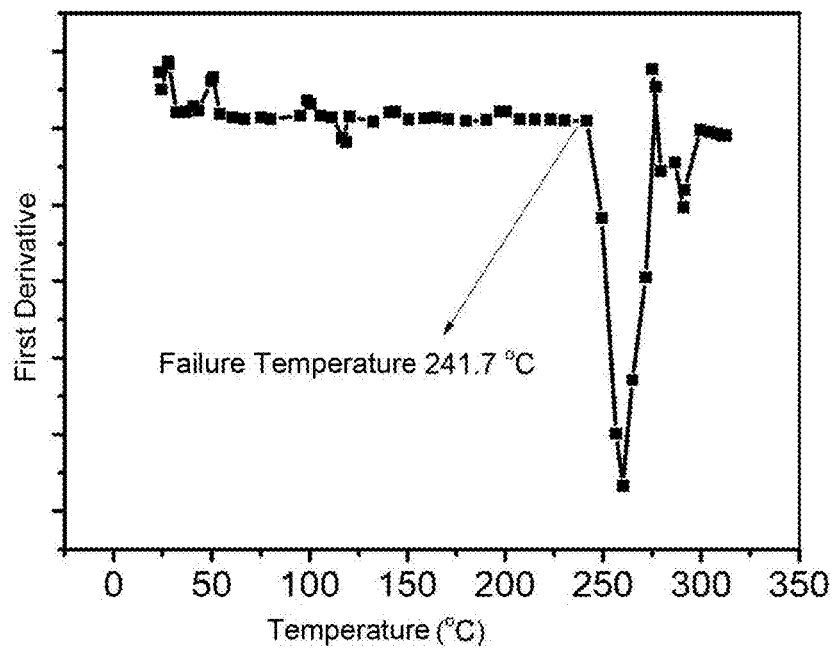
FIG. 3 shows a curve of first derivative and temperature resulted from FIG. 2.

NdFeB permanent magnet was used as sample 5, and the measured sample volume was 20 cm×10 cm×2 cm. The specific measurement steps are as follows:
1, turning on the laser heating device, and adjusting the power controller to adjust the laser energy to less than 1 mW; in order to minimize the influence of the magnet's magnetic field, using a lens of 10 cm to 20 cm to focus the laser on a corner of the upper surface of the sample, wherein the spot diameter is about 1 cm; placing the vacuum Hall probe close to the laser spot at a distance of 1 cm;
2, fixing the vacuum Hall probe, turning on the infrared thermal imager, wherein the laser spot is located at the center of the infrared thermal imager, and measuring the temperature changes of the laser spot;
3, adjusting the power controller of the laser heating device to gradually increase the temperature of the laser spot on the permanent magnet sample as the laser energy increases, using the vacuum Hall probe to measure the magnetic field changes near the laser spot on the sample, while recording the temperature changes of the corresponding laser spot with the infrared thermal imager; and
4, drawing the change curve of the magnetic field and temperature through the measurement system, as shown in FIG. 2; calculating the first derivative with the change curve of magnetic field and temperature, as shown in FIG. 3; the failure temperature is the temperature when the magnetic field starts to change drastically, and the failure temperature of the permanent magnet sample is 341.7° C.

Example 2

Figure 4:
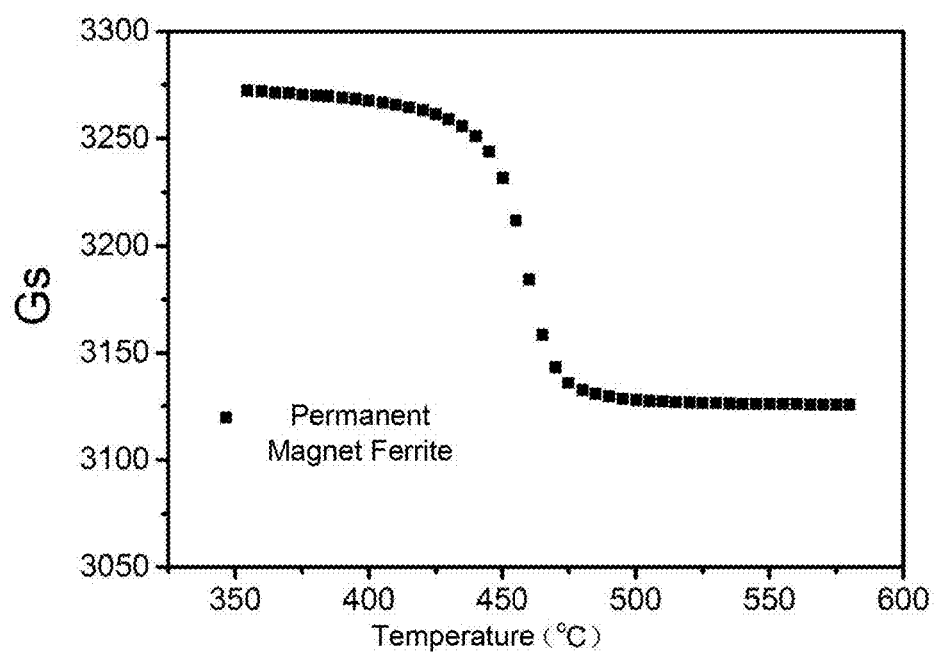
FIG. 4 shows a measured change curve of magnetic field and temperature of a permanent magnet ferrite sample.
Figure 5:
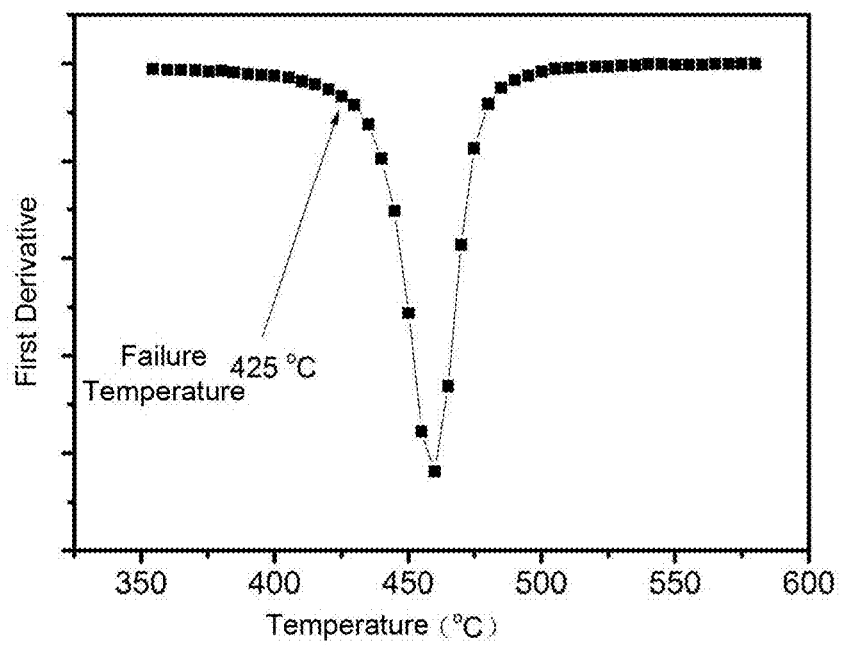
FIG. 5 shows a curve of first derivative and temperature resulted from FIG. 4.

BaFeO19 permanent magnet ferrite was used as sample 5. The shape of the sample is ring-like, the inner diameter is 3 cm, the outer diameter is 10 cm, and the height is 2 cm. The specific measurement steps are as follows:
1, turning on the laser heating device, and adjusting the power controller to adjust the laser energy to less than 1 mW; focusing the laser on the sample surface near the edge of the outer diameter with a lens of 10 cm to 20 cm, wherein the spot diameter is about 1 cm; placing the vacuum Hall probe close to the laser spot at a distance of 1.5 cm;
2, fixing the vacuum Hall probe, turning on the infrared thermal imager, wherein the laser spot is located at the center of the infrared thermal imager, and measuring the temperature changes of the laser spot;
3, adjusting the power controller of the laser heating device to gradually increase the temperature of the laser spot on the permanent magnet sample as the laser energy increases, using the vacuum Hall probe to measure the magnetic field changes near the laser spot on the sample, while recording the temperature changes of the corresponding laser spot with the infrared thermal imager; and
4, drawing the change curve of the magnetic field and temperature through the measurement system, as shown in FIG. 4; calculating the first derivative with the change curve of magnetic field and temperature, as shown in FIG. 5; the failure temperature is the temperature when the magnetic field starts to change drastically, and the failure temperature of the permanent magnet sample is 425° C.

The above are only specific embodiments of the present disclosure, but the protection scope of the present disclosure is not limited thereto. Any changes or substitutions without creative efforts fall into the protection scope of the present disclosure. Therefore, the protection scope of the present disclosure should be subject to the protection scope defined by the claims.

The invention claimed is:
1. A rapid measuring device for permanent magnet failure temperature, comprising:
a measurement system (1) configured with a computer and a connector, wherein the computer is connected to an infrared thermal imager (2), a vacuum Hall probe (3) and a laser heating device (4) through the connector;
the infrared thermal imager (2) configured to: monitor and record temperature changes of a permanent magnet sample (5) in real time, and transmit the recorded temperature changes to the computer;
the vacuum Hall probe (3) configured to: measure magnetic field changes of the permanent magnet sample (5) during heating, and transmit the measured magnetic field changes to the computer; and
the laser heating device (4) configured to control laser output energy for heating the permanent magnet sample (5);
wherein the computer is configured to:
obtain a change curve of magnetic field and temperature of the permanent magnet sample (5) by analyzing the recorded temperature changes from the infrared thermal imager (2) and the measured magnetic field changes from the vacuum Hall probe (3);
calculate a first derivative with the change curve of magnetic field and temperature to obtain a curve of first derivative and temperature; and
determine a failure temperature of the permanent magnet sample (5) based on the curve of first derivative and temperature, wherein the failure temperature is a temperature corresponding to a starting point of maximum trough of the curve of first derivative and temperature.

2. The rapid measuring device for permanent magnet failure temperature according to claim 1, wherein the laser heating device (4) comprises a laser source and a power controller configured to control laser energy output, and the laser heating device (4) has a laser output energy range from 1 mW to 1000 W.

3. The rapid measuring device for permanent magnet failure temperature according to claim 1, wherein the laser heating device (4) has an adjustable laser spot diameter ranging from 0.5 cm to 2 cm.

4. A measuring method using the rapid measuring device according to claim 1, comprising:
step 1: turning on the laser heating device (4), adjusting a power controller of the laser heating device (4) to adjust a heating laser energy to less than 1 mW, focusing a laser on a surface of the sample (5), and placing the vacuum Hall probe (3) close to a laser spot;

step 2: fixing the vacuum Hall probe (3) and using the infrared thermal imager (2) to measure the temperature changes of the permanent magnet sample (5) at the laser spot on the surface;

step 3: adjusting the power controller of the laser heating device (4) to gradually increase a temperature of the laser spot on the permanent magnet sample (5), and using the vacuum Hall probe (3) to measure the magnetic field changes near the laser spot on the sample (5) while recording the temperature changes at the corresponding laser spot with the infrared thermal imager; and step 4: obtaining, through the measurement system (1), the change curve of magnetic field and temperature of the permanent magnet sample (5) by analyzing the temperature changes recorded by the infrared thermal imager (2) and the magnetic field changes measured by the vacuum Hall probe (3), calculating, through the measurement system (1), the first derivative with the change curve of magnetic field and temperature to obtain the curve of first derivative and temperature, and determining, through the measurement system (1), the failure temperature of the permanent magnet sample (5) based on the curve of first derivative and temperature.

5. The measuring method according to claim 4, wherein the laser spot in step 1 has a diameter ranging from 0.5 cm to 2 cm, and a distance between the vacuum Hall probe and the laser spot ranges from 1 cm to 5 cm.

6. The measuring method according to claim 5, wherein the laser spot has a diameter of 1 cm, and the distance between the vacuum Hall probe and the laser spot is 1.5 cm.

* * * * *